(12) United States Patent
Flores Garcia

(10) Patent No.: US 10,292,344 B2
(45) Date of Patent: May 21, 2019

(54) HYDRO PLANTER

(71) Applicant: Jose Antonio Flores Garcia, Del. Cuauhtemoc (MX)

(72) Inventor: Jose Antonio Flores Garcia, Del. Cuauhtemoc (MX)

(*) Notice: Subject to any disclaimer, the term of this patent is extended or adjusted under 35 U.S.C. 154(b) by 65 days.

(21) Appl. No.: 15/300,013

(22) PCT Filed: Apr. 1, 2014

(86) PCT No.: PCT/IB2014/060339
§ 371 (c)(1),
(2) Date: Sep. 28, 2016

(87) PCT Pub. No.: WO2015/150866
PCT Pub. Date: Oct. 8, 2015

(65) Prior Publication Data

US 2017/0142918 A1 May 25, 2017

(51) Int. Cl.
*A01G 27/04* (2006.01)
*A01G 9/02* (2018.01)

(52) U.S. Cl.
CPC .............. *A01G 27/04* (2013.01); *A01G 9/028* (2013.01)

(58) Field of Classification Search
CPC .......... A01G 9/02; A01G 9/021; A01G 9/028; A01G 9/029; A01G 27/04; A01G 27/06
See application file for complete search history.

(56) References Cited

U.S. PATENT DOCUMENTS

| 918,563 | A | * | 4/1909 | Lewis | ................... | A01G 27/04 |
| | | | | | | 47/80 |
| 4,538,378 | A | * | 9/1985 | Roige | ................... | A01G 27/00 |
| | | | | | | 47/65.5 |

(Continued)

FOREIGN PATENT DOCUMENTS

| CA | 2407995 A1 | * | 2/2004 | ............. A01G 9/028 |
| DE | 29918433 U1 | * | 1/2000 | ............. A01G 27/06 |

(Continued)

OTHER PUBLICATIONS

"English Translation of Written Opinion in PCT/IB2014/060339,", dated Dec. 1, 2014, 5 pages.

(Continued)

*Primary Examiner* — Monica L Williams
*Assistant Examiner* — Aaron M Rodziwicz
(74) *Attorney, Agent, or Firm* — Sughrue Mion, PLLC

(57) ABSTRACT

The present invention concerns a hydro planter comprising an inner container which can accommodate a substrate, an absorption medium and an outer container. The inner container has one or more grids that enable liquid to filter from the inner container to the outer container. The absorption medium has at least one conductive element that is located in the substrate within the inner container and the conductive element is also located in the outer container, and the absorption medium also has a flattened portion which extends with the inner container. Finally, the outer container has two or more legs which enable the outer container to be supported on a surface and which form a gap through which air or water can flow, and the hollow interior of each leg forms a tank for storing a liquid, inside of which the lower portion of the conductive element is received. Thus, the hydro planter can receive plants, store liquid, supply said liquid to the plants, avoid spills, be adapted to concrete surfaces, to green flat roofs, to a modular system comprising (Continued)

a plurality of hydro planters, or a combination thereof; said hydro planter can improve thermal insulation and have a configuration that facilitates the transportation thereof, and can be manufactured with recyclable materials and low manufacturing costs.

21 Claims, 4 Drawing Sheets

(56) References Cited

U.S. PATENT DOCUMENTS

| | | | | |
|---|---|---|---|---|
| 5,535,542 | A * | 7/1996 | Gardner | A01G 27/04 47/18 |
| 6,226,921 | B1 * | 5/2001 | Kang | A01G 27/06 47/81 |
| 6,370,819 | B1 * | 4/2002 | Reiss | A01G 27/06 47/79 |
| 6,505,440 | B1 * | 1/2003 | Lai | A01G 27/06 47/79 |
| 8,312,674 | B2 * | 11/2012 | Adams | A01G 27/04 47/66.7 |
| 9,485,924 | B1 * | 11/2016 | Frye | A01G 27/06 |
| 9,854,756 | B2 * | 1/2018 | Pierce | A01G 27/06 |
| 2011/0258928 | A1 * | 10/2011 | Adams | A01G 9/02 47/79 |
| 2016/0150746 | A1 * | 6/2016 | Wood | A01G 27/04 47/81 |
| 2017/0202160 | A1 * | 7/2017 | Holtkamp, Jr. | A01G 22/00 |

FOREIGN PATENT DOCUMENTS

| | | | | |
|---|---|---|---|---|
| EP | 0788734 | A1 * | 8/1997 | ............... A91G 9/16 |
| ES | 2080695 | A1 | 2/1996 | |
| FR | 2618297 | A1 | 1/1989 | |
| FR | 2701808 | A1 * | 9/1994 | ............. A01G 27/04 |
| FR | 2842073 | A1 | 1/2004 | |
| GB | 2030037 | A | 4/1980 | |
| GB | 2393889 | A | 4/2004 | |
| JP | H10210872 | A | 8/1998 | |
| JP | H10215712 | A | 8/1998 | |
| JP | 20011045873 | A | 2/2001 | |
| WO | 9628964 | | 9/1996 | |
| WO | WO-9903325 | A2 * | 1/1999 | ............. A01G 27/06 |
| WO | WO-2015186830 | A1 * | 12/2015 | ............... A01G 9/02 |

OTHER PUBLICATIONS

"International Preliminary Report on Patentability in PCT/IB2014/060339,", dated Oct. 4, 2016, 5 pages. (See English Translation of Written Opinion for translation of relevant portions of IPRP, i.e., NPL #1).

"International Search Report in PCT/IB2014/060339,", dated Dec. 1, 2014, 7 pages (Spanish). (See reference patents and patent publications listed above for relevant disclosure in English).

"Written Opinion in PCT/IB2014/060339,", dated Nov. 28, 2014, 4 pages (Spanish).

* cited by examiner

HYDRO PLANTER

CROSS REFERENCE TO RELATED APPLICATIONS

This is a National Phase entry of International Application No. PCT/IB2014/060339, filed Apr. 1, 2014, the disclosure of which is incorporated herein by reference in its entirety.

TECHNICAL FIELD OF THE INVENTION

The present invention relates to the field of containers for receiving plants and vegetables. In particular, this invention concerns a hydro planter, which provides novel advantages in relation to hydro planters of the prior art.

BACKGROUND OF THE INVENTION

Currently, there are various designs of planters and hydro planters, all of them with different technical features to provide benefits to the user. However, none of the known designs incorporates in a single hydro planter all the features for receiving plants and vegetables, water storage, adapting means for concrete surfaces or green flat roofs, adapting into a modular system, maximize energy due to thermal insulation, system for preventing spills of stored water, and facilitate transportation and manufacturing.

There are some patent documents in the prior art addressed to partially provide some of these features. In this regard, U.S. Pat. No. 6,226,921 protects a planter conformed from a container which is divided by a plate, thus dividing the substrate area for planting and a water reservoir. The water in the reservoir rises by capillarity through a permeable wicking material that connects the reservoir with the substrate area. The planter further has an indicator tube that uses a float system to indicate the water level in the reservoir. Moreover, the planter also comprises a filling tube for filling the water reservoir. Finally, the bottom of the planter has a concave bottom circumscribed by the lower flange. This planter has the disadvantage that the water reservoir area cannot be drain, so if the planter receives excess of water, the excessive water has nowhere to leave. While the water in the reservoir could leave through the filling tube, the fact is that the water would leave through the filling tube until the water reaches the output level of said tube, thus flooding the whole substrate area. Additionally, the planter has the disadvantage that the configuration of the water level indicator tube increases the complexity of the planter, as well as its manufacturing cost. Another disadvantage is the flanged and concave bottom of the planter, which does not allow that the water on the outside of the planter can flow freely, either been a single planter or a set of planters. Finally, another disadvantage is that the planter cannot be stacked due to its internal elements, which makes its transportation difficult.

Moreover, the French Patent Application FR2618297 describes a pot divided into a substrate area for planting and a bottom area, wherein a grid separates both areas. Located inside the bottom area there is an inverted cover that separates a water reservoir area. The water in the reservoir is communicated to the bottom area through a channel that operates under Pascal's principle. The water that flows into the bottom area rises by capillarity through a permeable wicking material that connects the reservoir with the substrate area. The pot further comprises a filling tube for filling the water of the reservoir and a vent that communicates to the bottom area. Finally, the lower portion of the pot is a flat bottom. Such pot has the disadvantage that the water in the reservoir area or in the bottom area cannot be drain, so if the pot receives excess of water, the excessive water has nowhere to leave. While the water in the reservoir could leave through the filling tube, or the water of the bottom area through the vent, the fact is that the water would leave until the water reaches the output level of said tube or vent, respectively, thus flooding the whole substrate area. Additionally, the pot has the disadvantage that the elements conforming the configuration of communication between the reservoir and the bottom area operating under the Pascal's principle increases the complexity of the pot, as well as its manufacturing cost. Another disadvantage is that the flat bottom of the pot does not allow that the water on the outside of the pot can flow freely, either been a single pot or a set of pots. Finally, another disadvantage is that the pot cannot be stacked due to its internal elements, which makes its transportation difficult.

Similarly, the Japanese Patent Applications JP10210872A and JP10215712A describe a pot conformed from a container which is divided into a substrate area for planting and a water reservoir. The water of the reservoir rises by capillarity through a permeable wicking material connecting the reservoir with the substrate area. The pot further has vents inside the reservoir. Finally, the bottom part of the pot is a flat bottom. In application JP10210872A the pot is described with a capillarity implement for receiving the wick, while in application JP10215712A the pot is described with a capillarity layer receiving the wick configured with a plastic coating wherein water flow obstruction is prevented. These pots have the disadvantage that the configuration of the capillarity implement and the capillarity layer increase the complexity of the pot, as well as its manufacturing cost. Another disadvantage is that the flat bottom of the pots does not allow that the water on the outside of the pot can flow freely, either been a single pot or a set of pots. Finally, another disadvantage is that the pot cannot be stacked due to its internal elements, which makes its transportation difficult.

Finally, the Japanese Patent Application JP2001045873A describes an upper pot that is threaded on a lower container, thus dividing a substrate area for planting and a water reservoir. Additionally, the reservoir comprises a water delivery body that is threaded to the bottom of the pot and is filled with water. The water from the reservoir rises through the water delivery body and reaches a permeable material located within the substrate area. The pot further has a side vent. Finally, the inferior portion of the pot has a flat bottom circumscribed by a lower flange. This pot has the disadvantage that the configuration of the water delivery body increases the complexity of the pot, and its manufacturing cost. Additionally, the water delivery body cannot always keep water inside, so there is uncertainty regarding its operation. Moreover, the thread of the upper pot to the lower container limits the form to a circular pot that can be threaded. Another disadvantage is that the flat bottom of the pot does not allow that the water on the outside of the pot can flow freely, either been a single pot or a set of pots. Finally, another disadvantage is that the pot cannot be stacked due to its internal elements, which makes its transportation difficult.

Based on the foregoing, there is a need in the prior art of a hydro planter that allows the accommodation of plants, as well as storing water therein, in order to provide such water to the plants. Likewise, there is a need of a hydro planter that can prevent spills of the water stored inside. At the same time, it is desirable a hydro planter that can be adapted either to concrete surfaces, to green flat roofs, to a modular system comprising a plurality of hydro planters, or a combination thereof. Moreover, there is a need for a hydro planter that improves the thermal insulation of a house, office, or building. Finally, it is desirable a hydro planter in which configuration facilitates its transportation, and can be manufactured by recyclable materials and under low manufacturing costs.

SUMMARY OF THE INVENTION

An objective of the present invention concerns to provide an hydro planter configured to receive inside either plants and stored water, and including means for absorption of stored water to the plants.

Moreover, another objective of the present invention refers that the hydro planter should prevent spills of the water stored inside.

Another objective of the present invention concerns that the hydro planter should adapt to concrete surfaces or green flat roofs.

Moreover, another objective of the present invention concerns that the hydro planter be adapted in a modular system comprising a plurality of hydro planters.

Furthermore, another objective of the present invention is that the hydro planter allows improved thermal insulation of a house, office, or building.

Another objective of the present invention addresses to the configuration of the hydro planter to facilitate its transportation.

Finally, another objective of the present invention addresses that the hydro planter can be manufactured from recyclable materials and under low manufacturing costs.

BRIEF DESCRIPTION OF THE DRAWINGS

To provide a better understanding of the invention, the following drawings are attached herein.

DETAILED DESCRIPTION OF THE INVENTION

Figure 1A:
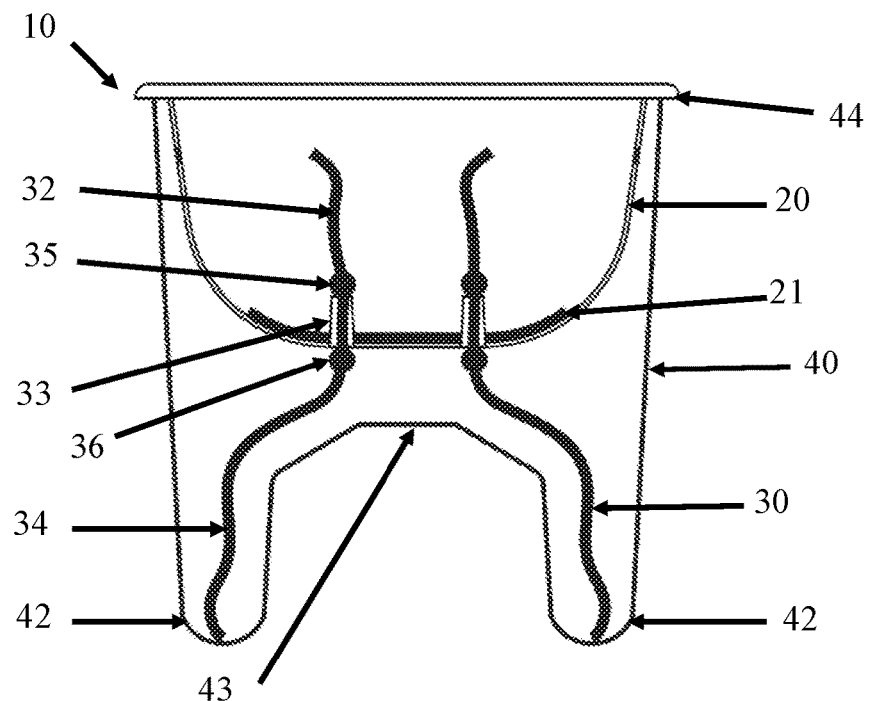
FIG. 1A refers to a cross-sectional view of the hydro planter of the present invention, without substrate.

The invention relates to a hydro planter which is properly illustrated in the figures accompanying the present description. FIG. 1A illustrates a hydro planter (10) that is composed by three main technical elements: an inner container (20), an absorbing medium (30), and an outer container (40). Preferably, the inner container (20) and/or the outer container (40) may be manufactured from a plastic or recycled material. In a preferred embodiment, the inner container (20) and/or the outer container (40) can be made from 100% recycled polypropylene. Preferably, the absorption medium (30) is a geotextile.

Figure 1B:
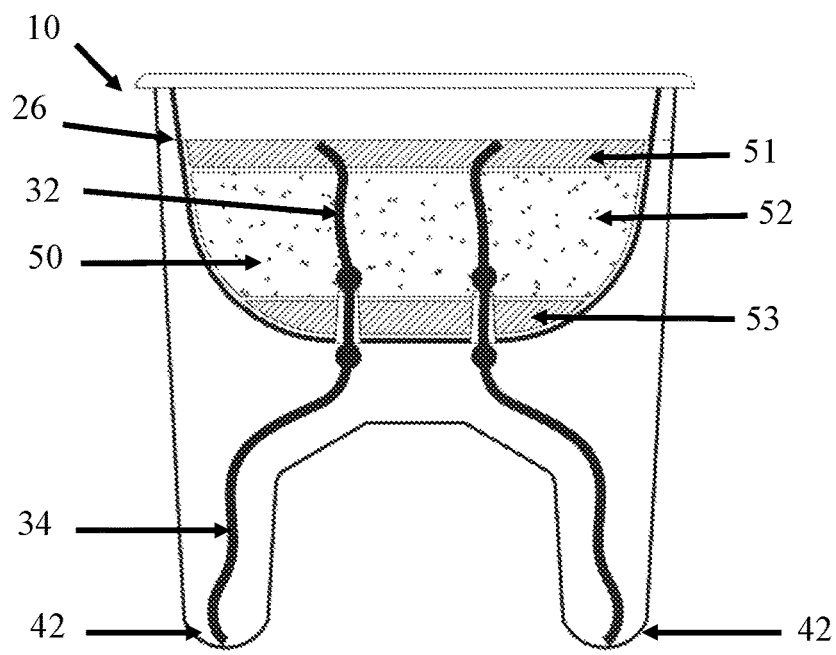
FIG. 1B refers to a cross-sectional view of the hydro planter of the present invention, with substrate.
Figure 2:
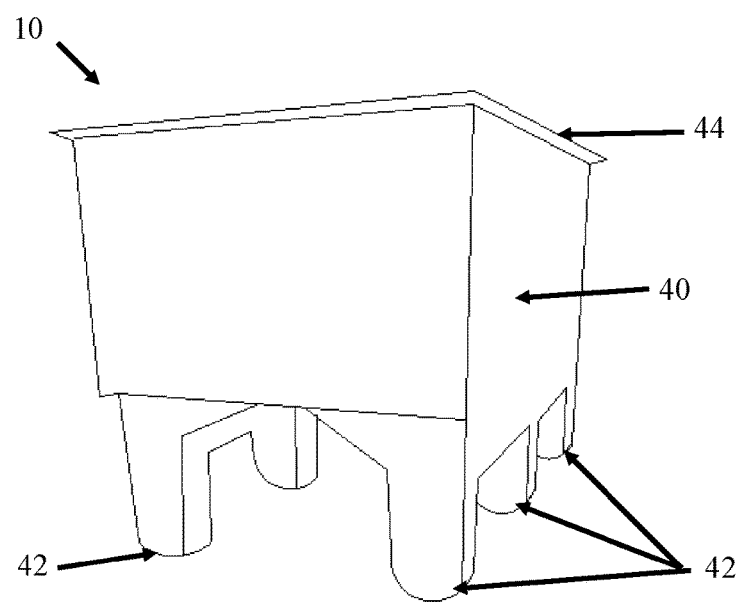
FIG. 2 refers to a front-left perspective view of a first embodiment of the hydro planter of the present invention.
Figure 3:
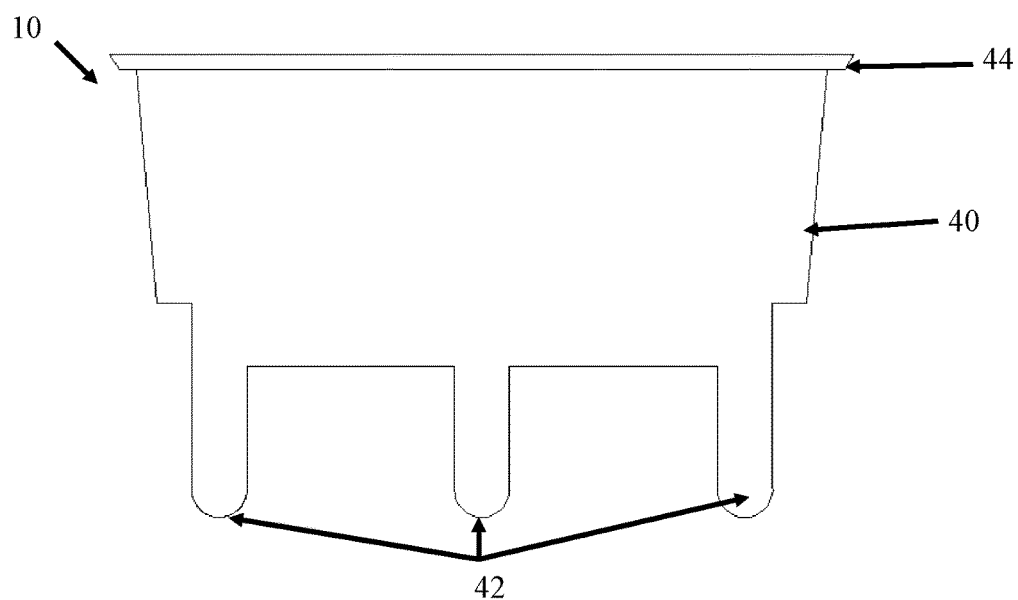
FIG. 3 refers to a front view of the first embodiment of the hydro planter of the present invention.
Figure 4:
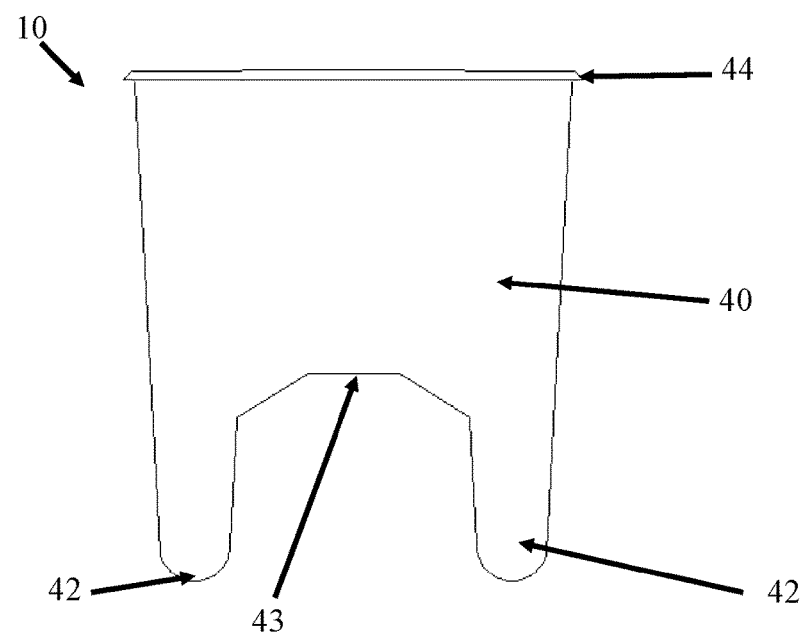
FIG. 4 refers to a left side view of the first embodiment of the hydro planter of the present invention.
Figure 5:
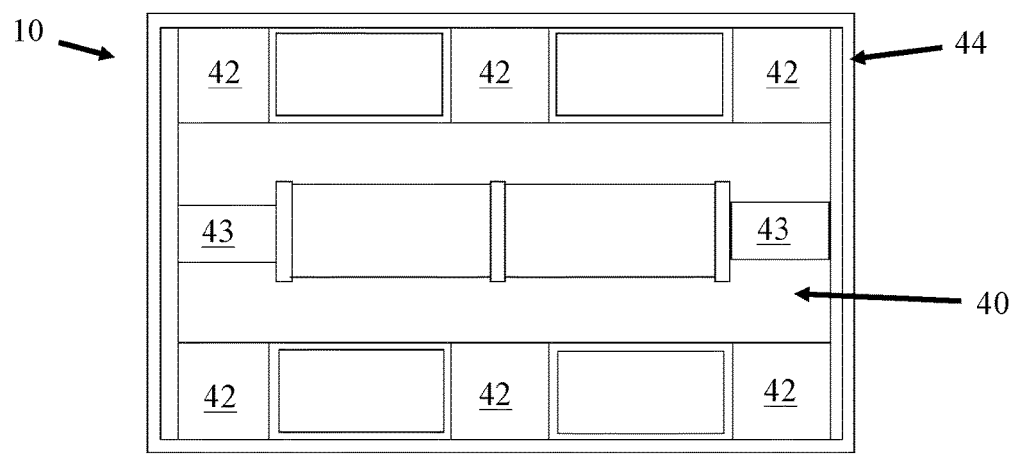
FIG. 5 refers to a top view of the first embodiment of the outer container of the hydro planter of the present invention.
Figure 6:
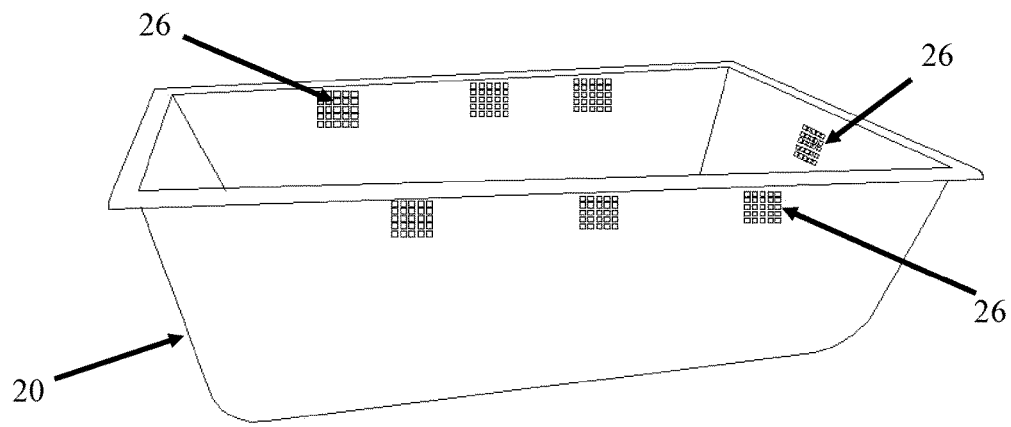
FIG. 6 refers to a top-front perspective view of the internal container of the hydro planter of the present invention.

In FIGS. 1A and 1B is illustrated the inner container (20) which is housed inside the outer container (40), without standing out from the latter. Preferably, the inner container (20) is hollow, elongated, and comprises a curved bottom (21) and fits into the outer container (40). Inside, the inner container (20) can accommodate a substrate (50) for growing a plant. In the preferred embodiment, the substrate (50) may be formed from a first substrate material (51), a second substrate material (52) and a third substrate material (53). Similarly, FIG. 1B shows the height where can be placed one or more grids (26) to allow filtration and water flow from the inner container (20) to the outer container (40) without spilling the substrate. Preferably, the grids (26) have a drainage capacity of 16 liters per sec/m2. In this respect, FIG. 6 shows the inner container (20) that has in a preferred embodiment a plurality of said grids (26).

Additionally, FIGS. 1A and 1B illustrate that the absorption medium (30) has a flattened portion (31) which extends with the curved bottom (21) of the inner container (20). The flattened portion (31) of the absorption medium (30) may extend over the curved bottom (21), below the curved bottom (21) or a combination of both. The flattened portion (31) further has at least one support (33). Furthermore, the absorption medium (30) has at least one conductive element (32,34) wherein an upper portion of the conductive element (32) is located in the substrate (50) within the inner container (20) and wherein a lower portion of the conductive element (34) is located in the outer container (40). In the preferred embodiment, the upper portion of the conductive element (32) has a flange (35) which contacts the top of the support (33) to prevent that the upper portion of the conductive element (32) leaves the inner container (20); and the lower portion of the conductive element (34) has a flange (36) which contacts the bottom of the support (33) to prevent that the lower portion of the conductive element (34) enters the inner container (20).

FIGS. 2 to 5 show that the outer container (40) is hollow and substantially parallelepiped shaped. In the preferred embodiment, the outer container (40) has an upper flange (44), a support surface (43) and two or more legs (42).

The legs (42) allow support of the outer container (40) on a surface and form a gap through which air or water can flow. In FIG. 1B it is shown that the hollow interior of each leg (42) is formed a reservoir that receives the lower portion of the conductive element (34). Preferably, the reservoirs can store water or other suitable liquid for growing plants.

Figure 7:
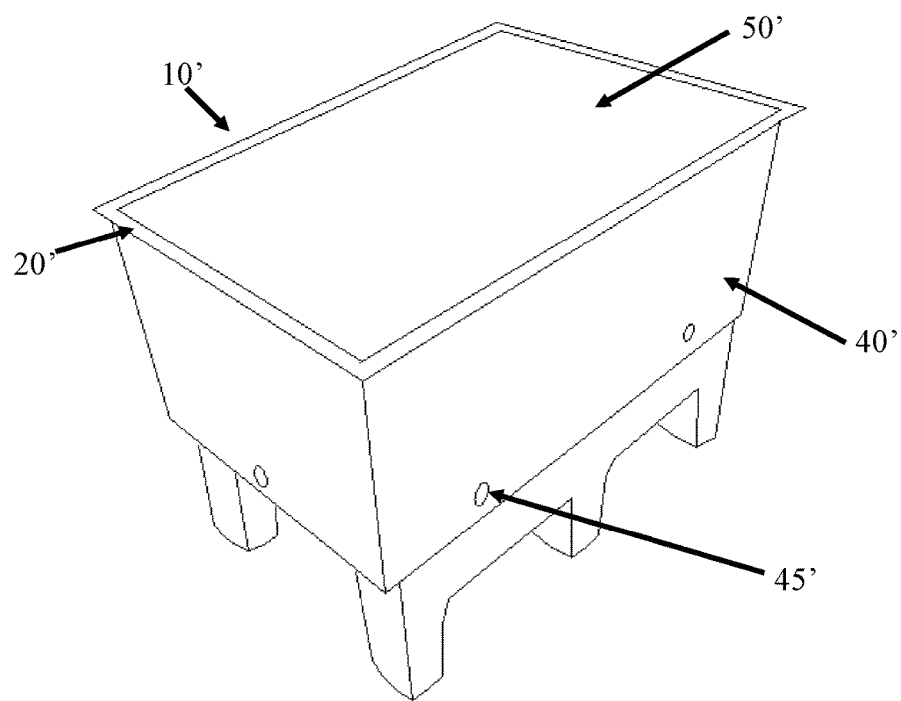
FIG. 7 refers to a top-front-left perspective view of a second embodiment of the hydro planter of the present invention.

Finally, FIG. 7 illustrates a second embodiment of hydro planter (10') of the present invention. In this figure, is illustrated an inner container (20') which accommodates inside a substrate (50'), wherein the inner container (20') is housed within an outer container (40'). The second embodiment differs from the first embodiment illustrated in that the outer container (40') has draining means (45') to allow leaving of excess fluid at a suitable height.

During operation, the hydro planter (10) allows one or more plants growing in the substrate (50) inside the inner container (20). The reservoirs formed in the legs (42) of the outer container (40) store water or other suitable liquid for growing plants, which is absorbed through the lower portion of the conductive element (34) towards the upper portion of the conductive element (32), which discharge into the substrate (50) passively by capillarity effect. If the liquid exceeds the volume of the inner container (20), the liquid may leave the outer container (40) when reaching the convenient height where the grids (26) are located, without spilling the substrate.

In accordance with the above mentioned and described, the hydro planter (10) has several advantages combined in a simple design.

The hydro planter (10) corresponds to a modular unit within a modular system that can be formed from a plurality of hydro planters (10) aligned to create places with vegetation, with low maintenance, easy installation, on roofs or concrete surfaces. It does not require special preparations prior to installation since the height of its legs (42) allows the excess water can drain and flow over the concrete slab easily avoiding stagnation of water under the hydro planter (10). In a preferred embodiment, the outer container (40) of the hydro planter (10) can have 32 cm of width and 52 cm of length. In another preferred embodiment of use of the invention, it can be used six hydro planters (10) to cover one square meter.

Additionally, the rounded shape of the legs (42) does not hurt the waterproofing (if placed on a roof) and the supporting surface only represents 3% of the total area occupied by the hydro planter (10).

Another important advantage of the hydro planter (10) of the present invention consists of the free airflow that can pass between the legs (42). This airflow produces "wind tunnels" which allow to cool the space between hydro planters (10) and the concrete slab to streamline its acting as an agent that prevents heat gain of the roof slab, thereby reducing heat gain in the interior of a house, home, office, building, or architectural space. However, in order to provide further basis to this advantage attributed to the hydro planter (10), it has been determined the value of conductivity or thermal conductance (K) experimentally, as shown in Table 1, and the thermal resistivity (R) and overall heat transfer coefficient (U), as shown in Table 2:

TABLE 1

Conductance per element (K)

| Material or layer | Thickness "t" | Conductance "K" W/m° C. |
|---|---|---|
| Plants | **** | **** |
| Vegetal soil | 0.20 | 1.80 |
| Second container-soil (recycled plastic) | 0.02 | 0.32 |
| Textile material | 0.03 | 0.045 |
| Air 1 | 0.05 | 0.05 |
| Hydro planter - water (recycled plastic) | 0.02 | 0.32 |
| Air 2 | 0.05 | 0.05 |
| ΣTotal: | | 0.43 |

TABLE 2

Resistivity per element (R) and overall heat transfer coefficient (U)

| Material or layer | Thickness "t" | Conductance "K" W/m° C. | Resistivity "R" R = e/c |
|---|---|---|---|
| Plants | **** | **** | **** |
| Vegetal soil | 0.20 | 1.80 | 0.11 |
| Second container-soil (recycled plastic) | 0.02 | 0.32 | 0.06 |
| Textile material | 0.03 | 0.045 | 0.67 |
| Air 1 | 0.05 | 0.05 | 1.00 |

TABLE 2-continued

Resistivity per element (R) and overall heat transfer coefficient (U)

| Material or layer | Thickness "t" | Conductance "K" W/m° C. | Resistivity "R" R = e/c |
|---|---|---|---|
| Hydro planter - water (recycled plastic) | 0.02 | 0.32 | 0.06 |
| Air 2 | 0.05 | 0.05 | 1.00 |
| ΣTotal: | | | 2.90 |

Hydro Planters "U" Value = 0.34

The lowest value of K and the highest value of R determine the best thermal insulation. Comparative tables 3 and 4 were made, and the hydro planters system was located on 6th place in heat resistivity compared with products already on the market and that are the most used currently, and regarding conductivity was located on 7th place. It shall be considered that the thickness of each of the materials including hydro planters system is different and vary in between them, and that materials compared with the system are not natural systems.

TABLE 3

Comparison per value R

| Material | "R" Factor |
|---|---|
| Polyurethane | 9.09 |
| Glass fiber | 4.54 |
| Polystyrene | 4.16 |
| Cork | 3.7 |
| Mineral wool | 3.33 |
| Hydro planter | 2.90 |
| Foam glass | 2.63 |
| Vermiculite | 2.08 |

TABLE 4

Comparison per value K

| Material | "K" Factor |
|---|---|
| Polyurethane | 0.12 |
| Glass fiber | 0.23 |
| Polystyrene | 0.24 |
| Cork | 0.27 |
| Mineral wool | 0.31 |
| Hydro planter | 0.38 |
| Foam glass | 0.43 |
| Vermiculite | 0.48 |

Another advantage of the hydro planter (10) is the collection of rainwater. In a preferred embodiment, the hydro planter (10) can have a storage capacity of 6 liters of water achieving high storage capacity of rainwater. For example, in the embodiment of modular system comprising six hydro planters (10) per square meter, rainwater collection capacity would be liters per square meter. However, in order to provide further basis to this advantage attributed to hydro planter (10), it has been determined rainwater collection experimentally, by measuring and monitoring the amount of water collected was determined in a system comprising 5 hydro planters system per square meter during the period from Jun. 21 to Oct. 10, 2011, as shown in Table 5:

TABLE 5

| | | | | | |
|---|---|---|---|---|---|
| | | Collecting rainwater | | | |
| Millimeters | Liters | M³ per hydro planter | M³ per 1M² | In 100 M² of hydro planters = M³ | |
| 179573 | 179 | 0.18 | 0.9 | 90 | |

Due to the measuring recorded in Table 5, it was determined that the hydro planters system can collect during the most intensive period of rain in Mexico City up to 900 liters per square meter; so that, in 100 square meters of green roof it could be collected 90,000 liters of water.

Finally, an additional advantage is facilitating transportation of hydro planter (10) and its components. Either inner containers (20), as well as outer containers (40), can be stacked one inside other with stops that prevent tighten, thus facilitating their separation and saving in transport.

Based on the above disclosure, certain embodiments and details have been described in order to illustrate the present invention, and will be apparent to those skilled in the art that variations and modifications can be made without departing from the scope of the present invention.

What is claim is:

1. A hydro planter comprising:
   an inner container which accommodates a substrate;
   an absorption medium; and
   an outer container,
   wherein the inner container is accommodated inside the outer container;
   wherein the inner container has one or more grids at a height above a bottommost inside surface of the inner container,
   wherein the one or more grids are configured to allow filtration of fluid of the inner container to the outer container without spilling the substrate,
   wherein the absorbing medium comprises at least one conductive element,
   wherein an upper portion of the conductive element is located in the substrate within the inner container,
   wherein a lower portion of the conductive element is located in the outer container,
   wherein the absorption medium further comprises a flattened portion which extends to the inner container and further comprises at least one support,
   wherein the outer container comprises two or more legs that allow supporting the outer container on a surface and form a gap configured to allow air or water to flow through the gap,
   wherein each leg comprises a hollow interior forming a reservoir for configured to store a liquid and configured to receive the lower portion of the conductive element, and
   wherein the outer container comprises a drain configured to allow excess fluid to drain at a height above a bottommost inside surface of the outer container.

2. The hydro planter according to claim 1, wherein the inner container is accommodated inside the outer container without standing out of the outer container.

3. The hydro planter according to claim 1, wherein the inner container is hollow, elongated, comprises a curved bottom and fits into the outer container.

4. The hydro planter according to claim 1, wherein the substrate is formed from one or more substrate materials.

5. The hydro planter according to claim 1, wherein the one or more grids has a drainage capacity of 16 liters per sec/m2.

6. The hydro planter according to claim 1, wherein the inner container has a curved bottom.

7. The hydro planter according to claim 6, wherein the flattened portion of the absorption medium extends over the curved bottom, below the curved bottom or a combination of both.

8. The hydro planter according to claim 1, wherein the conductive element has a first flange configured to prevent an upper portion of the conductive member from leaving the inner container, and
   wherein the conductive element also has a second flange configured to prevent a lower portion of the conductive element from entering the inner container.

9. The hydro planter according to claim 1, wherein the outer container is hollow and substantially parallelepiped shaped.

10. The hydro planter according to claim 1, wherein the outer container has an upper flange and a support surface.

11. The hydro planter according to claim 1, wherein the reservoir is configured to store water or other suitable liquid for growing plants.

12. The hydro planter according to claim 1, wherein the inner container and/or the outer container are manufactured from a plastic or recycled material.

13. The hydro planter according to claim 12, wherein the inner container and/or the outer container are made from 100% recycled polypropylene.

14. The hydro planter according to claim 1, wherein the absorbing medium is a geotextile.

15. The hydro planter according to claim 1, wherein the hydro planter is a modular unit in a modular system formed from a plurality of aligned hydro planters.

16. The hydro planter according to claim 1, wherein the legs are configured with a height that allows the excess fluid to drain and flow over the surface to avoid stagnation under the hydro planter.

17. The hydro planter according to claim 1, wherein the legs have a rounded shape.

18. The hydro planter according to claim 1, wherein the hydro planter has a thermal conductance of 0.43 W/(m° C.), a thermal resistivity of 2.90 (m° C.)/W, and an overall heat transfer coefficient of 0.34 W/m³° C.

19. The hydro planter according to claim 1, wherein the hydro planter is configured to collect rainwater in the reservoir.

20. The hydro planter according to claim 1, wherein the one or more grids are disposed in outer peripheral side surfaces of the inner container.

21. The hydro planter according to claim 1, wherein the drain is disposed in an outer peripheral side surface of the outer container.

* * * * *